United States Patent
Jiang et al.

(10) Patent No.: US 12,172,328 B1
(45) Date of Patent: Dec. 24, 2024

(54) DISPLAYING OPERATING ENVIRONMENT OF ROBOT BY OBJECT DETECTION

(71) Applicant: SHENZHEN YUEJIANG TECHNOLOGY CO., LTD., Guangdong (CN)

(72) Inventors: Yu Jiang, Guangdong (CN); Xulin Lang, Guangdong (CN); Rui Huang, Guangdong (CN); Junjie Xie, Guangdong (CN); Zhufu Liu, Guangdong (CN)

(73) Assignee: SHENZHEN YUEJIANG TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/401,419

(22) Filed: Dec. 30, 2023

(51) Int. Cl.
B25J 9/16 (2006.01)

(52) U.S. Cl.
CPC .......... *B25J 9/1697* (2013.01); *B25J 9/1666* (2013.01); *B25J 9/1676* (2013.01); *B25J 9/161* (2013.01); *B25J 9/1653* (2013.01)

(58) Field of Classification Search
CPC ...... B25J 9/1697; B25J 9/1666; B25J 9/1676; B25J 9/161; B25J 9/1653
See application file for complete search history.

(56) References Cited

U.S. PATENT DOCUMENTS

| | | | |
|---|---|---|---|
| 2013/0063560 A1 | 3/2013 | Roberts et al. | |
| 2014/0168073 A1 | 6/2014 | Chizeck et al. | |
| 2017/0364076 A1* | 12/2017 | Keshmiri | G05B 19/41 |
| 2018/0304467 A1* | 10/2018 | Matsuura | B25J 13/06 |
| 2019/0321983 A1* | 10/2019 | Chen | B25J 9/1656 |
| 2021/0170603 A1* | 6/2021 | Kotlarski | B25J 13/006 |
| 2021/0237286 A1* | 8/2021 | Liu | G01D 5/243 |
| 2021/0260760 A1* | 8/2021 | Allmendinger | B25J 9/1643 |
| 2021/0291369 A1* | 9/2021 | Hashimoto | B25J 13/088 |
| 2022/0203535 A1* | 6/2022 | Bai | B25J 9/1671 |

(Continued)

FOREIGN PATENT DOCUMENTS

| | | |
|---|---|---|
| CN | 101459857 A | 6/2009 |
| CN | 107850936 A | 3/2018 |
| CN | 108492356 A | 9/2018 |

(Continued)

OTHER PUBLICATIONS

Cao Linpan et al.; CN 110315556 A translation; Shenzhen Yuejiang Tech Co Ltd; A kind of robot electronic skin, robot and exchange method; Oct. 11, 2019 (Year: 2019).*

(Continued)

*Primary Examiner* — Adam R Mott
*Assistant Examiner* — Heather J Keniry
(74) *Attorney, Agent, or Firm* — PV IP PC; Wei Te Chung; Christopher S Ruprecht

(57) ABSTRACT

A method for displaying an operating environment of a robot. The method includes determining an object type of each of one or more objects in the operating environment of the robot based on sensory information acquired by the robot; constructing a three-dimensional (3D) virtual environment of the operating environment based at least in part on the object type of each of the one or more objects; and displaying the 3D virtual environment of the operating environment via a display interface.

22 Claims, 9 Drawing Sheets

(56) References Cited

U.S. PATENT DOCUMENTS

2023/0158686 A1\* 5/2023 Gao ................ B25J 9/1694
700/246
2024/0009845 A1\* 1/2024 Floyd-Jones .......... B25J 9/1697

FOREIGN PATENT DOCUMENTS

| CN | 110315556 A | \* | 10/2019 | ............. B25J 11/00 |
|---|---|---|---|---|
| CN | 111230928 A | | 6/2020 | |
| CN | 111507425 A | | 8/2020 | |
| CN | 111930127 A | | 11/2020 | |
| CN | 112476438 A | | 3/2021 | |
| CN | 112770875 A | | 5/2021 | |
| CN | 113673292 A | | 11/2021 | |
| CN | 115038554 A | | 9/2022 | |
| EP | 2277441 A1 | | 1/2011 | |

OTHER PUBLICATIONS

International Search Report in International application No. PCT/CN2024/079981, mailed on Jun. 29, 2024.
Written Opinion of the International Search Authority in International application No. PCT/CN2024/079981, mailed on Jun. 29, 2024.

\* cited by examiner

DISPLAYING OPERATING ENVIRONMENT OF ROBOT BY OBJECT DETECTION

TECHNICAL FIELD

The present disclosure relates to the field of robotics technology, particularly to a method for displaying an operating environment of a robot, a non-transitory computer-readable storage medium, a system, and a robot.

BACKGROUND

In recent years, robotics technology has made significant advancements, leading to a revolution in automation across various industries. One crucial aspect of robotics is robot modeling, which involves creating mathematical representations of robots and their behaviors. This enables accurate simulations and optimization of robot operations. In the context of industrial automation, robot modeling plays a vital role in enhancing manufacturing processes by simulating and optimizing robot movements. Real-time simulations using robot models help identify and address potential issues, thereby improving productivity and operational workflows in complex manufacturing environments.

However, traditional robot modeling techniques mainly focus on kinematics, dynamics, and control algorithms, which are essential for understanding robot behavior and enhancing performance. Nevertheless, other factors such as obstacles, variations in terrain, and environmental conditions should not be overlooked. These factors can significantly impact the robot's decision-making, navigation capabilities, and overall operational efficiency due to the interactions between the robots and their surrounding environments.

SUMMARY

This summary aims to introduce in a simplified manner a selection of concepts that are elaborated upon in the Detailed Description section below. It is not meant to identify key or essential features of the claimed subject matter, nor should it be used to determine the scope of the claimed subject matter. Furthermore, additional aspects, features, and/or advantages of examples will be provided in the following description and may also become apparent through practice of the disclosed principles.

According to an aspect of the present disclosure, a method for displaying an operating environment of a robot is provided. The method includes: determining an object type of each of one or more objects in the operating environment of the robot based on sensory information acquired by the robot; constructing a three-dimensional (3D) virtual environment of the operating environment based at least in part on the object type of each of the one or more objects; and displaying the 3D virtual environment of the operating environment via a display interface.

According to another aspect of the present disclosure, a non-transitory computer-readable storage medium is provided. The non-transitory computer-readable storage medium has stored thereon instructions that, when executed by one or more processors, cause the one or more processors to execute operations including: determining an object type of each of one or more objects in an operating environment of a robot based on sensory information acquired by the robot; constructing a three-dimensional (3D) virtual environment of the operating environment based at least in part on the object type of each of the one or more objects; and displaying the 3D virtual environment of the operating environment via a display interface.

According to yet another aspect of the present disclosure, a system is provided. The system includes one or more sensors; one or more processors; and one or more memory devices that store instructions that, when executed by the one or more processors, cause the one or more processors to execute operations including: determining an object type of each of one or more objects in an operating environment of a robot based on sensory information acquired by the robot; constructing a three-dimensional (3D) virtual environment of the operating environment based at least in part on the object type of each of the one or more objects; and displaying the 3D virtual environment of the operating environment via a display interface.

According to still yet another aspect of the present disclosure, a robot is provided. The robot includes a mechanical arm; one or more sensors, the one or more sensors including an electronic skin; a controller; a display; one or more memory devices that store instructions that, when executed, cause the controller to execute operations including: determining an object type of each of one or more objects in an operating environment of a robot based on sensory information acquired by the robot; constructing a three-dimensional (3D) virtual environment of the operating environment based at least in part on the object type of each of the one or more objects; and displaying the 3D virtual environment of the operating environment via a display interface.

Other aspects are also provided.

BRIEF DESCRIPTION OF THE DRAWINGS

To facilitate a clearer and more straightforward understanding of the technical solutions presented in embodiments of the present disclosure, the following will briefly introduce the drawings that may be helpful for understanding the embodiments. It should be noted that the drawings discussed in conjunction with the following detailed description are merely a few illustrations of the present disclosure. Those of ordinary skill in the art may obtain other drawings based on these drawings without requiring additional creative effort.

Figure 1:
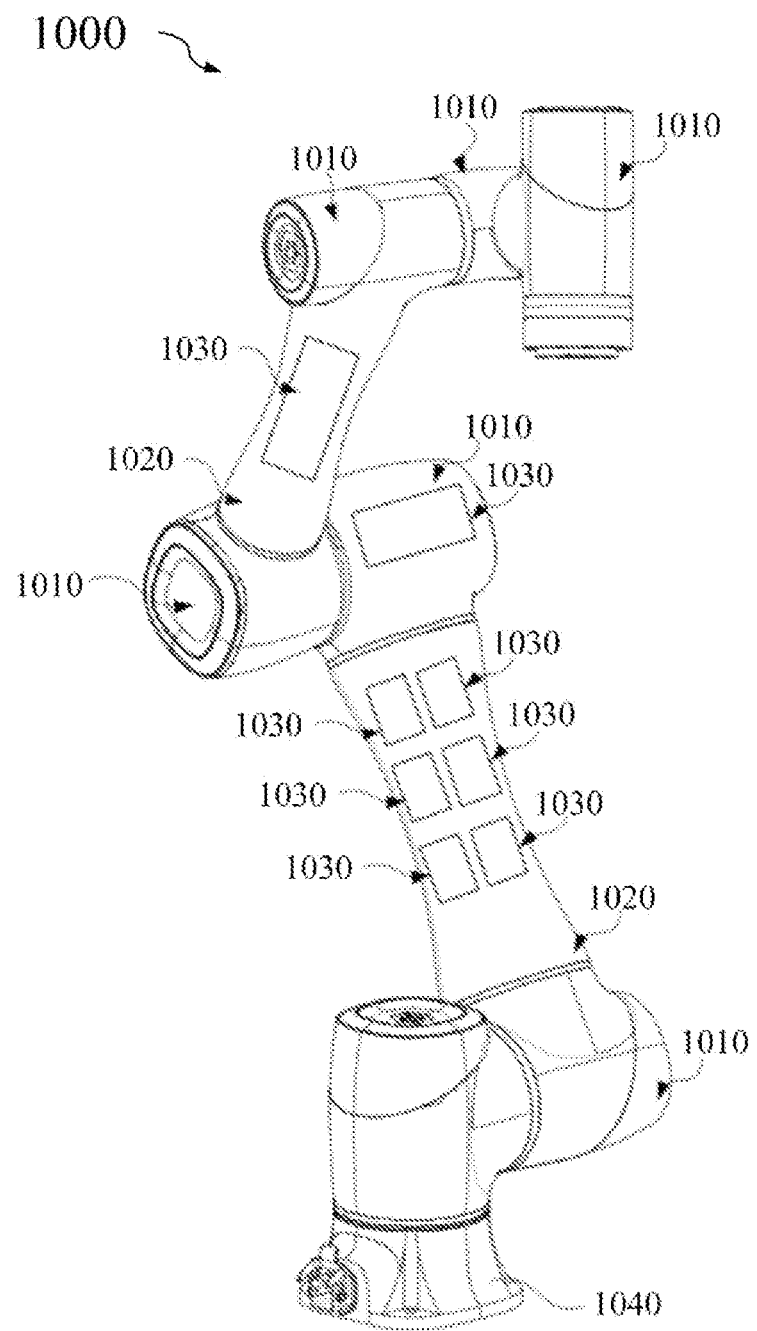
FIG. 1 illustrates a schematic diagram of an exemplary device according to some embodiments of the present disclosure.

For the purpose of simplicity and clear illustration, the elements depicted in the figures may not be drawn to scale. Some elements may appear exaggerated in size relative to others for clarity. Additionally, reference numerals may be repeated across the figures to indicate corresponding or analogous elements as deemed appropriate.

DETAILED DESCRIPTION

The terms "first", "second", and "third" used in the embodiments of the present disclosure are solely for descriptive purposes and should not be construed as indicating the relative importance or implying the number of technical features discussed. Therefore, a feature described as "first", "second", or "third" may explicitly or implicitly include one or more of such features. In the present disclosure, "a plurality of" signifies at least two items, such as two, three, or more, unless otherwise specified. Additionally, the terms "comprising", "including", and "having", and their variations, intend to encompass a non-exclusive inclusion. For instance, a process, method, system, article of manufacture, or device that comprises a series of steps or units does not solely consist of the listed steps or units but may also optionally include other unstated steps or units or implicitly incorporate other steps or units inherent to such process, method, article of manufacture, or device.

The term "embodiment" used herein indicates that a specific feature, structure, or characteristic described in conjunction with the embodiments may be present in at least one embodiment of the present disclosure. The occurrences of the phrase "in one embodiment" at various locations in the specification do not necessarily refer to the same embodiment, and separate or alternative embodiments are not mutually exclusive. Those of ordinary skill in the art can understand that the embodiments described herein may be combined with other embodiments found throughout the specification.

Please refer to FIG. 1, which illustrates a schematic diagram of an exemplary device according to some embodiments of the present disclosure. The device may be a mechanical device, for example, a robot 1000. The robot 1000 may include at least one joint 1010, at least one mechanical arm 1020, and at least one electronic skin 1030.

It is to be understood that FIG. 1 schematically illustrates the electronic skin 1030 covering part of a surface of the robot 1000, but the electronic skin 1030 may also cover an entire surface of the robot 1000.

The robot 1000 may include abase 1040, which is connected to the at least one joint 1010 or mechanical arm 1020. The base 1040 may be arranged on or affixed to an operation platform or surface to provide a stable operating condition for the robot 1000. Additionally, the base 1040 may also be movable. For example, one or more driving wheels may be installed at the bottom of the base 1040 to facilitate mobility of the robot 1000, allowing it to adapt to non-stationary operation scenarios and increasing its flexibility.

In this embodiment, at least one end of a mechanical arm 1020 is connected to a joint 1010. Each joint 1010 may include, for example, at least one actuating component (not shown) that may cause a mechanical arm 1020 connected thereto to swing. The robot 1000 may include one joint 1010 and one mechanical arm 1020, or may include a plurality of joints 1010 and a plurality of mechanical arms 1020. The number of joints 1010 and mechanical arms 1020 may depend on the design and purpose of the robot 1000, and is not limited herein. When a plurality of mechanical arms 1020 are included, two of them may be rotatably connected by joints 1010 connected at their respective ends, and movement of the mechanical arms 1020 may be achieved through relative rotations of the joints 1010.

In some embodiments, each mechanical arm 1020 may include a metal bracket (not shown) and a robot control system (not shown). The robot control system may be coupled to the electronic skin(s) 1030, which may be wrapped on an outer surface of the metal bracket. The metal bracket may serve as a metal frame or shell for the mechanical arm 1020, providing a place for the attachment of the electronic skin(s) 1030. It should be noted that the metal bracket is grounded to ensure normal operation of the robot 1000. The electronic skin(s) 1030, in cooperation with the robot control system, enables control of various operations of the mechanical arm 1020, such as rotation, swinging, obstacle avoidance, and the like.

In other embodiments, each joint 1010 may include a joint bracket (not shown) and a robot control system (not shown). The robot control system may be coupled to the electronic skin(s) 1030, which may be wrapped on an outer surface of the joint bracket. Optionally, the material of the joint bracket may for example be a conductive material such as metal, and the joint bracket may be grounded to ensure the normal operation of the robot 1000. Of course, the rotation and actuation of the mechanical arm 1020 may also be achieved by the joint 1010. In this case, the electronic skin 1030, together with the robot control system, controls both the joint 1010 and the mechanical arm 1020 to perform operations such as rotation, swinging, obstacle avoidance, and the like.

It is to be understood that both the outer surface of the joint bracket of the at least one joint 1010 and the outer surface of the metal bracket of the at least one mechanical arm 1020 may be wrapped with at least one electronic skin 1030. Additionally, the robot control system may generally be arranged independently of the robot and may include a display and a controller. Alternatively, the robot control system may be partially arranged (e.g., the controller of the robot control system being arranged) in the base 1040, the robotic arm 1020, and/or the joint 1010.

Based on investigations on the modeling techniques for robots in the related art, the inventors of the present disclosure have discerned that modeling the operating environment of a robot is of equal importance, comparable to modeling the robot itself which typically includes the robot's kinematics, dynamics, and behavior patterns. This is because the interaction between the robot and its surroundings significantly impacts operations, movement trajectories, and performance of the robot. The significance of modeling the operating environment should not be underestimated, as it offers numerous benefits across various fields like industrial automation, healthcare and rehabilitation, defense and security, exploration and space missions, entertainment and education.

Accurate modeling of the operating environment enables the robot to adapt and respond effectively to its surroundings, facilitating obstacle understanding, navigation, collision avoidance, and movement optimization. For example, in industrial automation, precise modeling of the factory floor layout, equipment placement, and potential obstacles empowers the robot to efficiently handle materials, perform assembly tasks, or engage in quality control. Similarly, in healthcare and rehabilitation, modeling the patient's environment and physical surroundings may play an important role in assisting with mobility, rehabilitation exercises, and activities of daily living. The defense and security sector may also benefit from environment modeling. By simulating diverse terrains, building layouts, and potential threats, robots can be deployed efficiently and effectively for surveillance, reconnaissance, or search and rescue missions. In exploration and space missions, accurate environment modeling may facilitate planning and executing tasks in remote and inhospitable environments. In summary, environment modeling optimizes robot trajectories and decision-making processes, thereby enhancing their capabilities and applications in various domains.

Figure 2:
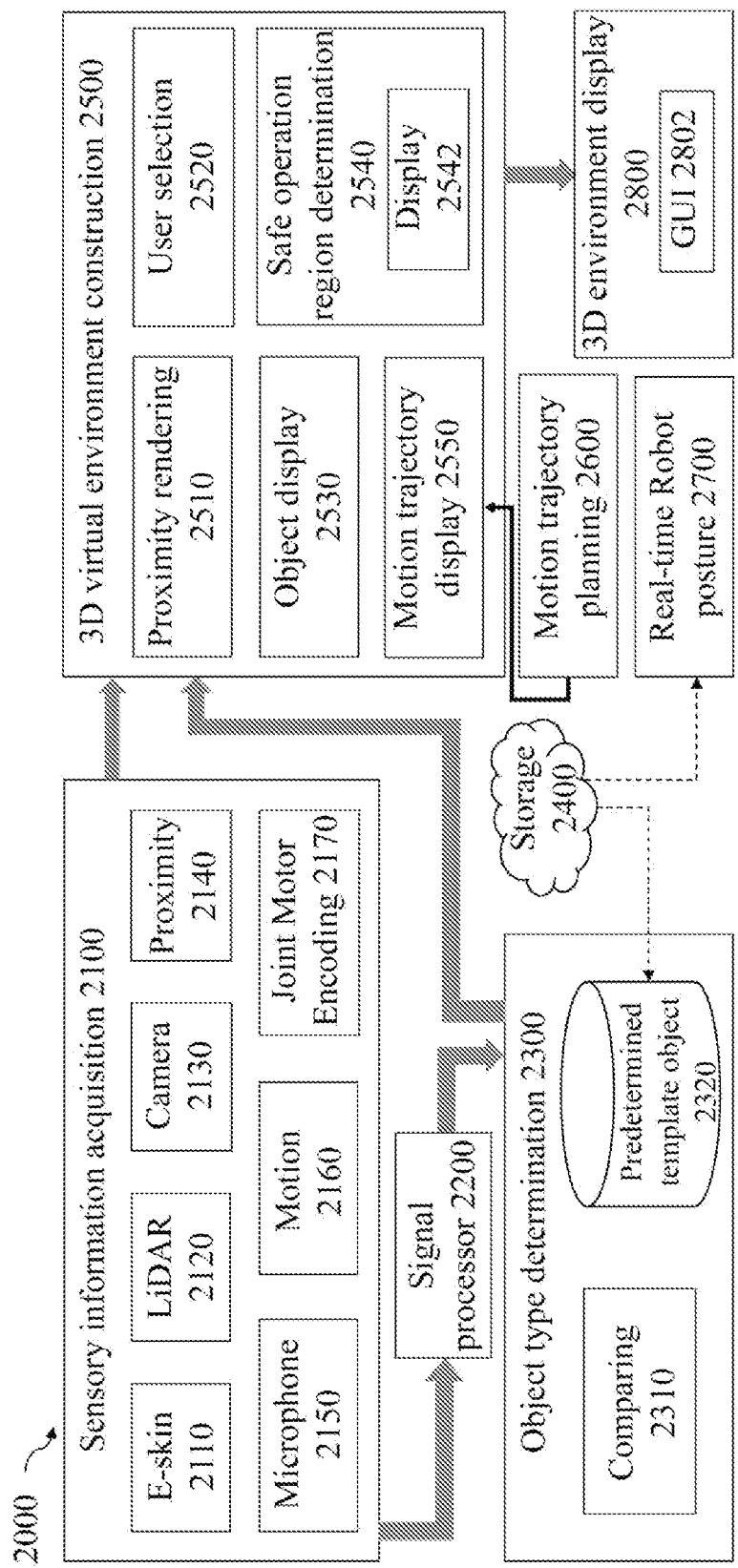
FIG. 2 illustrates a schematic diagram of an exemplary system capable of executing the methods disclosed herein according to some embodiments of the present disclosure.

FIG. 2 illustrates a schematic diagram of an exemplary system capable of executing the methods disclosed herein according to some embodiments of the present disclosure. As shown in FIG. 2, a system 200 may include a sensory information acquisition module 2100 for obtaining sensory information, an object type determination module 2300, a three-dimensional (3D) virtual environment construction module 2500, and a 3D environment display module 2800. The sensory information acquisition module 2100 may include an electronic skin (E-skin) unit 2110, a LiDAR unit 2120, a camera unit 2130, a proximity sensing unit 2140, an acoustic detection unit 2150, a motion sensing unit 2160, and a joint motor encoder 2170. In some examples, each of these units may be integrated to a robot, for example, the robot 1 shown in FIG. 1. In other examples, some units may be integrated to a robot, for example, the robot 1 shown in FIG. 1, while some other units may be arranged separately from the robot.

The E-skin unit 2110 may include one or more electronic skins arranged in an array on a mechanical arm of a robot (e.g., as shown in FIG. 1) for sensing shapes of one or more objects present in a surrounding of the robot.

In the present disclosure, electronic skin may be construed as an array of electrodes. The array of electrodes may include at least one electrode unit arranged in an array. The principle of detecting objects with electrodes is that when an object approaches, capacitance value of a respective electrode unit changes, which may be detected by a configured LC oscillation circuit. Initially, each electrode unit may have a certain baseline capacitance value. The proximity of the object may be associated with a difference between a detected capacitance value and the baseline capacitance value of the respective electrode. For example, the closer an object is, the larger a detected capacitance value of a respective electrode. To better determine the shape of an object, each electrode unit may correspond to a respective LC oscillation circuit, allowing the capacitance value of each electrode unit to be detected independently. The principle of detecting the shape of an object with an array of electrodes is that each electrode unit in the array of electrodes has a respective coordinate. When an object approaches, the capacitance values of the electrode units that have changed, along with their respective coordinates, may be used to obtain a fitted shape of the object.

Specifically, based on profiles of all of the electrode units in the array, including deviations of detected capacitance values from respective baseline capacitance values and coordinate information of the electrode units, a set of point cloud data that may describe positional coordinates and depth information of an object may be exported so as to obtain (for example, calculate) a fitted shape of the object (especially the surface shape). As is readily appreciated by those of ordinary skill in the art, based on the number and density of the array of electrodes, the point cloud data may also be expressed as positional data or three-dimensional mesh data. Depth information may refer to distances between a surface of an object (or part of the object) located within a detection range of the array of electrodes facing one side of the array, and each electrode unit that generates signal(s) indicating capacitance variations.

Moreover, due to the limited obstacle detection range of the electronic skin(s), in many cases only part of the object within the detection range of the electronic skin(s) may be detected instead of the complete object. Therefore, to achieve better 3D modeling of objects in a surrounding of a robot, edges of the detection range need to be delimited and smoothed. For example, a distance threshold may be predetermined, such that capacitance values of respective electrode units are selected only if their detected distances to an object (e.g., an obstacle) are less than the distance threshold. If some detected distances exceed the distance threshold, then it may indicate that a low confidence level exists for the capacitance values of related electrode units, and that these capacitance values may be discarded.

Although the present disclosure describes the process of detecting objects with capacitive electronic skin(s), it should be understood that the electronic skin(s) may take any other suitable forms, such as resistive electronic skin(s), conductive electronic skin(s), inductive electronic skin(s), or the like. The present disclosure does not impose any limitations in this regard.

In some examples, if the E-skin unit 2110 is used solely for detecting the proximity of objects, then such detection may also be done by a single electrode unit.

In some examples, the LiDAR unit 2120 may be used to help determine the depth information of objects around the robot or the closest distance to the robot (such as a closest component of the robot).

In some examples, the camera unit 2130 may be used to assist in determining the depth information of individual objects in the surrounding of the robot, especially when the camera unit 2130 includes a depth camera, a stereo camera, an infrared camera, a Time-of-Flight (TOF) camera, etc. or a combination thereof, which is capable of capturing information about depth of field, object distance, shape, and/or position, enabling performing tasks such as object detection, pose estimation, and scene reconstruction in various application scenarios. In an example, the range of framing/capturing/sensing of the camera unit 2130 may be greater than the detection ranges of the E-skin unit. It is to be understood that the purpose of including the LiDAR unit 2120 and/or the camera unit 2130 may be, for example, instead of obtaining a modeled representation of an operating environment of the robot by means of importing modeling files or manually inputting parameters by users, such sensing units may be used to conduct on-site scanning of the operating environment where the robot is located in order to pre-model the operating environment.

In some examples, the proximity sensing unit 2140 may be used to assist in determining the proximity of surrounding objects to the robot. In some cases, the proximity sensing unit 2140 may be equipped with advanced algorithms to detect and track moving objects, allowing the robot to dynamically adjust its path and behavior to ensure effective and reliable interaction with its surroundings.

In some examples, the acoustic detection unit 2150 may be used to capture acoustic signals of individual objects in the surrounding of the robot, for determining the orientation, position, and/or movement direction of these objects, particularly when the objects have distinctive acoustic characteristics. This aids in the efficient determination of the distances, shapes, and/or contours of respective objects by some other units, such as the E-skin unit 2110, the LiDAR unit 2120, or the proximity sensing unit 2140.

In some examples, the motion sensing unit 2160 may include an accelerometer, a gyroscope, a magnetometer, etc., or a combination thereof, to provide comprehensive motion sensing capabilities for obtaining a state of motion of the robot. By integrating measurement data from the motion sensors included in the motion sensing unit 2160, the sensory information acquisition module 2100 may be able to acquire critical motion information in real time such as acceleration, angular velocity, attitude, and direction of movement of the robot, facilitating support for tasks including robot navigation, localization, path planning, control, or the like.

In some examples, the joint motor encoder 2170 may be used to obtain rotation data of robotic arm and/or joints and to encode the acquired rotation data of the robotic arm and/or joints so that they may be provided, for example, in real time or at intervals, to a three-dimensional (3D) virtual environment construction block 2500 described hereinafter, thereby enabling (e.g., modeling-based) display of the robotic arm. According to some embodiments, the 3D virtual environment described herein is not limited to a first-person perspective graphical representation but may also be represented (e.g., displayed) from a third-person perspective, depending on specific applications and/or usage of the robot.

These units included in the sensory information acquisition module 2100 may operate in coordination with each other to efficiently and comprehensively acquire sensory information about the robot's surrounding and the objects present therein. It is to be understood that the units described above are merely provided for illustrative purposes. Those of ordinary skill in the art may readily appreciate that the sensory information acquisition module 2100 may include more, fewer, or different units than that shown in FIG. 2. For example, in some cases, the sensory information acquisition module 2100 may include a temperature sensing unit. The temperature sensing unit may be used to determine a temperature distribution of individual objects and/or areas in the surrounding of the robot. This provides additional information about the impact of these objects on the robot's safety, particularly in scenarios where the robot explores hazardous terrain or operates in high-risk industrial production environments. In some cases, the sensory information acquisition module 2100 may include a gas sensing unit to detect the presence of combustible/hazardous gas leaks in an environment where the robot operates, which is particularly useful in situations involving robot operations in unknown environments. The present disclosure does not limit the specific types and/or quantities of sensing units included in the sensory information acquisition module 2100.

Then, types of the objects in the surrounding of the robot may be identified based on the information acquired by the sensory information acquisition module 2100, enabling construction and differentiation of three-dimensional models of these objects. This facilitates obtaining of an enhanced modeled representation of the three-dimensional environment in which the robot interacts with the objects included therein to perform operations associated with a given task in the environment.

In some embodiments of the present disclosure, system 200 may include a signal processor module 2200. In some examples, the signal processor module may be a general-purpose signal processor (such as Digital Signal Processor (DSP) or System-On-Chip (SoC), etc.), a dedicated signal processor (such as Application-Specific Integrated Circuit (ASIC), Field-Programmable Gate Array (FPGA), image processor, audio processor, or video processor, etc.), or a combination thereof. The signal processor module 2200 may be responsible for processing various types of sensory information acquired by the sensory information acquisition module 2100. For instance, in the case where the sensory information is point cloud data, the processing may include point cloud segmentation, point cloud completion, point cloud detection, point cloud registration, or the like. In the case where the sensory information is in the form of image signals, the processing carried out by the signal processor module 2200 may include image processing operations, such as scaling, rotating, segmenting, enhancing, compressing, or the like. For acoustic signals, the processing may include audio signal processing techniques such as time-frequency domain transformations, audio quality enhancement, noise reduction, or the like.

Based on the received sensory information (e.g., raw or processed sensory information), different types of objects existing in the space where the robot is located are identified to distinguish the three-dimensional models of the objects to be manipulated or avoided by the robot. In some examples, the different object types may include predetermined objects and non-predetermined objects. As an example and not as a limitation, predetermined objects may be explicitly or implicitly specified by a user (e.g., an operator or a developer of the robot or the system 200), or may be pre-stored objects imported into a three-dimensional virtual environment, such as a mechanical arm or a portion thereof, a workbench, a tool, a work-piece to be processed or the like. In addition, non-predetermined objects may refer to objects that are not specified by the user, or may be objects that are not imported into the three-dimensional virtual environment in advance, such as a human, or other obstacles that randomly appear in the operating environment of the robot, or the like. In some cases, the work-piece to be processed may be a predetermined object, which may be explicitly or implicitly specified by the user, or may be imported into the three-dimensional virtual environment in advance via a modeling file.

The object type determination module 2300 may receive the processed sensory information from the signal processor module 2200 and/or may receive the raw (e.g., unprocessed) sensory information directly from the sensory information acquisition module 2100. As shown in FIG. 2, the object type determination module 2300 may include a comparing module 2310 and a predetermined template object database 2320. During an actual operation of the robot, after the sensory information acquisition module 2100 acquires sensory information about objects in a surrounding where the robot is located, the object type determination module 2300 may determine whether there are any predetermined objects in the surrounding.

In some examples, based on the sensory information obtained by the robot, when positional data and/or surface shape in the sensory information match positional data and/or surface shape of a predetermined template object, the matched positional data and/or surface shape is identified as being attributed to a predetermined object. As used herein, for the E-skin unit 211, the positional data in the sensory information may refer to coordinates of an object detected in an operating environment of the robot. These coordinates may be construed as coordinates of discrete key feature points on surface(s) of the object or as a collection of coordinates constituting the surface(s) of the object. The positional data of the predetermined template object may be construed as coordinates of discrete points such as key feature points on surface(s) of the object or as a collection of all points constituting a 3D model of the predetermined template object. As used herein, on one hand, for the sensory information acquired, for example, by the E-skin unit 2110 of the sensory information acquisition module 2100, the surface shape may refer to a surface of an object (or a part of the object) within a detection range of the E-skin unit 211, facing towards the E-skin unit 211, which surface shape may be derived based on computations of spatial coordinates of each electrode unit that generates signal(s) indicating capacitance variation(s) as well as an object distance sensed by the electrode unit, and may be represented in the form of point cloud data, stereo mesh data, individual positional data, feature-based local shape description, or a fitted smooth surface representation; on the other hand, for predetermined template objects, the surface shape may refer to information that may describe a surface shape of a predetermined template object, such as a shape, boundaries and/or position of the predetermined template object, obtained from a user-imported modeling file or manually entered dimensional parameters, preferably in a representation that is consistent with the representation of the perceptually acquired surface shape of the (e.g., real) object, in order to facilitate similarity comparisons. If a match is found in terms of positional data and/or surface shape, the sensory information may be attributed to a predetermined template object, and the object corresponding to that sensory information may be classified as a predetermined object. It is to be understood that the term "match" as used herein may refer to the followings: if there is a spatial overlap between the positional data detected by the E skin unit 2110 and the positional data of any one or more of the pre-stored predetermined template objects, the positional data of the overlapping portion(s) may be identified as being attributed to the corresponding predetermined template object(s); and/or if a similarity of the sensed surface shape to the surface shape of any one or more of the pre-stored predetermined template objects is greater than a predetermined threshold, the surface shape of the portion(s) for which the similarity is greater than the predetermined threshold may be identified as being attributed to the corresponding predetermined template object(s). This shape matching may be implemented by comparing features such as contours, edges, or key points of the compared objects. The threshold for the matching may be adjusted based on requirements of specific application(s) to achieve a desired accuracy. Furthermore, verification(s) of the position and surface shape of objects may be performed to ensure the accuracy of identification.

In some examples, data of the predetermined template objects (e.g., positional data and/or surface shapes of the predetermined template objects, etc.) may be stored in the form of entries in the predetermined template object database 2320. In some examples, the predetermined template object database 2320 may be co-located with the comparing module 2310 within the object type determination module 2300. In some examples, the predetermined template object database 2320 may be separate from the object type determination module 2300 (e.g., located in remote). In some examples, a storage 2400 may be deployed, for example, on a cloud server. Optionally, the predetermined template object database 2320 may receive new entries or updated entries about the predetermined template objects from the storage 2400. In some examples, existing entries in the predetermined template object database 2320 may be loaded from the storage 2400.

Based on the sensory information acquired by the robot, when the positional data and/or surface shape(s) in the sensory information do not constitute a match with the positional data and/or surface shapes of all of the predetermined template objects, the positional data and/or surface shape(s) that do not constitute the match may be identified as being attributed to a non-predetermined object. It should be noted that the sensory information may contain both positional data (and/or surface shape(s)) attributed to the predetermined template objects and positional data (and/or surface shape(s)) attributed to non-predetermined objects, and the positional data and/or surface shape(s) that do not constitute the match may only be part of the sensory information. As an example and not a limitation, it is to be understood that in the case where the sensed positional data does not spatially overlap with that of any of the predetermined template objects, and/or similarities between the sensed surface shape and the surface shapes of all predetermined template objects are below a predetermined threshold, then it is considered that a match may not be found. In some examples, objects of which the object type is non-predetermined object may be stationary or non-stationary.

In some cases, regarding the matching mentioned throughout the description, it may also refer to the case where the robot may be taught that the sensory information acquisition module only acquires sensory information that excludes the position and/or surface shape(s) of the predetermined template object(s) upon importing model(s) of the predetermined template object(s). The perceived object, which corresponds to such sensory information, may be directly identified as a non-predetermined object.

In some examples, it may be preferable to import a modeling file of the operating environment in which the robot operates in order to obtain information about objects in the default physical environment. Subsequently, the various units included in the sensory information acquisition module (such as the E-skin unit 2110, etc.) are used to perceive the surrounding environment of the robot and objects therein. Then, the information of objects in the default physical environment may be compared/matched with the perceived object information to identify which of the objects are the imported ones, followed by determining of the object type(s) (e.g., predetermined versus non-predetermined object type) and/or modeling of the non-imported object(s).

As shown in FIG. 2, one or both of the sensory information acquisition module 2100 and the object type determination module 2300 may communicatively connect to the three-dimensional (3D) virtual environment construction module 2500, allowing the 3D virtual environment construction module 2500 to individually model one or more objects in the robot's environment based on the acquired sensory information and the determined object types. In some examples, the signal processor module 2200 may also communicatively connect to the 3D virtual environment construction module 2500 to provide the processed sensory information, although this connection is not shown in the figure.

In some examples, the 3D virtual environment construction module 2500 may include a proximity rendering unit

2510, a user selection unit 2520, an object display unit 2530, a safe operating region determination unit 2540, and a motion trajectory display unit 2550.

As an example and not as a limitation, objects in the three-dimensional virtual environment may be annotated with their distances from a respective electronic skin (e.g., the closest electronic skin) of the robot and/or may be differentiated by color to indicate proximity. For instance, the objects may be divided into N distance ranges, and each range is associated with a distinct color for three-dimensional modeling of objects falling within that distance range. The color depth, chrominance, transparency, or other optical/visual properties of the object's model may be configured to be correlated with the distance, with closer objects appearing darker. In some cases, when an object is large in size, it may span multiple distance ranges, causing the object's color to be rendered with different depths, chrominance, or transparency, etc., depending on each distance range over which it spans. This may also provide intuitive cues for safe operations. It is to be understood that any other suitable graphical means for indicating the proximity between objects and the robot can be employed, which is not limited herein.

As an example and not as a limitation, if the detected sensory information is identified as being attributed to predetermined object(s), the module may display a three-dimensional model of the object according to predetermined rules. Under general circumstances, after the modeling file of the environment where the robot is located is imported, it is preferable to display all predetermined template objects directly in the 3D virtual environment, such that when the object type determination module 2300 judges that the type of a certain object is a predetermined object according to the acquired sensory information, the object is not repeatedly modeled and displayed by default. In some cases, once an object is identified as a predetermined object, a 3D model of the predetermined object is demonstrated (e.g., according to predefined rules) in the 3D virtual environment.

In some examples, the proximity rendering unit 2510 may be configured to render the color depth, chrominance, transparency, or a combination thereof of models of sensed object based on the distance between each of the sensed objects and a respective closest component of the robot. Additionally, or alternatively, the proximity rendering unit 2510 may indicate the distance between a sensed object and the respective closest component of the robot.

As an example and not as a limitation, a preferred way of displaying in the 3D virtual environment the predetermined objects is to show all of them. However, there may be provided options in a display interface, allowing users to select which predetermined objects to display and which ones not to display. For non-predetermined objects, there may also be presented options on the display interface, allowing users to select whether and which of the 3D models or representations of the non-predetermined objects is/are to be displayed.

In some examples, the user selection unit 2520 may be configured to provide options on a display interface for selecting any one of the objects identified as predetermined objects and/or any one of the objects identified as non-predetermined objects present in a physical environment in which the robot locates for display in a corresponding 3D virtual environment.

In some examples, one of the strategies for displaying a three-dimensional model of an object may include: determining whether (e.g., raw and/or processed) sensory information is attributed to a mechanical arm or a portion thereof based on the sensory information. In some examples, determining whether sensory information is attributed to a mechanical arm or a portion thereof may involve comparing positional data and/or surface shapes sensed by e.g. electronic skin with robotic arm attitude information (e.g., relative positions and angles of rotation of individual robotic arm components) and kinematic models, among others. In some examples, in the case where it is determined that the sensory information is attributed to the robotic arm or a portion thereof, it may not be displayed repeatedly.

In some examples, one of the strategies for displaying a three-dimensional model of an object may also include: displaying the object when it is being sensed (for example, determined) by the electronic skin as a moving object.

In some examples, one of the strategies for displaying a three-dimensional model of an object may include: continuously displaying an object when it is confirmed to be a fixed object after perception/sensing. A display strategy for fixed objects may include: displaying the objects relative to a (e.g., fixed) reference point in the three-dimensional space, such as the case where certain tool(s) is fixed under some working conditions. In some cases, fixed objects may be considered as obstacles when planning the robot's motion trajectories.

In some examples, one of the strategies for displaying a three-dimensional model of an object may include: associating properties of a displayed 3D model of the object, such as size, completeness of details, clarity of contour, or the like with a distance between the object and the robot (e.g., electronic skin(s)).

In some examples, one of the strategies for displaying the three-dimensional model of an object may include: inputting the object's 3D model into the system directly by a control program or a user, retrieving model representation(s) (e.g., implicitly) from a cloud storage (e.g., the storage 2400), or calculating a fitted model of the object based on the sensed information of the object gathered from sensors such as the electronic skin(s), camera, proximity sensor, or the like.

As an example and not as a limitation, the identification of whether sensory information is attributed to a predetermined tool may be based on positional information of the object sensed by for example the electronic skin(s), positional information of mechanical arm(s) collected by for example an internally-integrated sensor(s), and a determination of relative position between the object and the mechanical arm(s). The predetermined tool may include an end effector or a pipeline that follows the motion of the mechanical arm (e.g., compliant cable(s)), or the like, which is not limited herein. The compliant cable attached to a robot may be visible in the 3D virtual environment. In some cases, the compliant cable may be arranged on a body of the robot to provide electricity (e.g., for backup power supply) or to make provision for backup control and data communication (e.g., serving as a means for wired communication). In some cases, the compliant cable may communicate with a mechanical gripper. It is to be understood that the functionalities of the compliant cable may be adapted to specific applications and/or operating environments, and the present disclosure does not impose any limitation thereon. During the operation by the robot in the physical environment, the representation of compliant cable may remain within a field of view of the first-person/third-person perspective and are substantially stationary relative to at least a portion of the robot (e.g., relative to the end portion of the mechanical arm where the mechanical gripper is mounted) within the 3D virtual environment. In some examples, the compliant cable may be pre-imported template objects. In some examples, the compliant cable may be a non-predetermined object due to varying requirements of operation scenarios and/or tasks of the robot.

In other words, the graphical representation of the compliant cable within the 3D virtual environment may not be based on any imported modeling-related files, but is an approximation (e.g., fitted representation) derived from processing of the sensory information acquired by one or more sensors of the robot. It is to be understood that compliant objects may include any other suitable objects that may move together with the robot or a portion thereof and/or be constrained to the robot body. For example, compliant objects may include but not limited to wheeled, tracked or articulated transmission mechanisms, which are not limited herein.

In some examples, whether positional data in the sensory information is attributed to the predetermined tool may be determined based on the positional data, posture of the robot, and predefined positional relationship between the predetermined tool and an ontology model of the robot. As used herein, the ontology model of a robot refers to a model that represents the main structure or body portions of a robot system, which may include components such as robotic arms, joints, chassis, actuators, etc. that constitute the robot body. The ontology model may define the robot's geometric shape, freedoms of movement, postures of motion, etc. By using ontology models to represent robots in a modeling environment, robots in the physical environment may be manipulated to complete various tasks, such as moving, grasping, and manipulating objects. In an example, if it is determined that the sensory information is attributed to the predetermined tool, the object may be displayed in the 3D virtual environment in a stationary manner relative to at least a portion of the robot. As such, a more intuitive rendering of the environment and real-time update of object status may be provided, and functions such as robot operation and path planning may be supported.

In situations where the presence of non-predetermined objects exists in the robot's environment, path planning for robot obstacle avoidance becomes more complex compared to scenarios where only predetermined objects are present. This complexity arises from the need to simultaneously consider both these non-predetermined objects and other predetermined objects. To address this, an approach may be followed to determine a safe operating region based on the positions and shapes of predetermined objects. When non-predetermined objects enter (e.g., appear in) the environment (e.g., 3D virtual environment or, more specifically, the determined safe operating region), obstacle avoidance paths may subsequently be planned based on the non-predetermined objects to ensure that the planned paths remain within the safe operating region.

In some examples, the safe operating region determination unit 2540 may be configured to determining a safe operating region of the 3D virtual environment based on the predetermined object(s) in the 3D virtual environment.

Additionally, the safe operating region determination unit 2540 may include a display sub-unit 2542 for preparation of displaying in the 3D virtual environment the determined safe operating region, for example, formulating a strategy for displaying the safe operating region (e.g., color, line shape, shadow, etc., or a combination thereof).

In some examples, displaying of planned motion trajectories (e.g., for a mechanical arm) may include: (a) deviating the displayed motion trajectory to bypass objects, including both predetermined objects and non-predetermined objects, which ensures that the planned motion avoids collisions with any obstacles in the path; (b) bringing the displayed motion trajectory closer to certain objects, such as a subject to be grasped, which allows for precise positioning and interaction with specific objects of interest; (c) displaying path points along the motion trajectory, including the starting point, ending point, and intermediate points, which provides a visual representation of the planned trajectory and aids in understanding the robot's intended movement or modifying the planned trajectories by the user, or the like.

In some examples, a motion trajectory planning module 2600 may be deployed in the system 2000. The motion trajectory planning module 2600 may be configured to plan a motion trajectory of the robot. In some cases, the motion trajectory may be determined to be in the safe operating region while avoiding the non-predetermined object. In some examples, the planned trajectories may always remain within the safe operating region, thereby ensuring the safety of robot operations.

In some examples, the motion trajectory display unit 2550 may be configured to receive one or more planned motion trajectories of the robot for displaying them on a display interface along with the determined safe operating region.

In some examples, the 3D environment display module 2800 can be configured to display constructed 3D models of objects, a 3D virtual environment corresponding to the physical environment where the robot locates, the determined safe operation zone(s), and/or planned robot motion trajectories, among others. In some examples, the 3D environment display module 2800 may include a graphical user interface (GUI) 2802 to provide display functionality.

In some examples, documents related to modeling may be imported into the robot's control unit (for example, a controller, a microprocessor or the system 200, etc.) to build the 3D operating environment. These documents may for example be CAD documents or other related files. The CAD documents may describe the 3D models of predetermined objects, including their shapes and positional coordinates.

In some examples, the CAD documents may be stored in the storage 2400.

In some examples, the real-time robot posture module 2700 may be deployed in the system 200 and configured to receive CAD documents from the storage 2400 for real-time display when the detected object(s) is identified as the robot or a portion thereof. In some cases, the robot body or a portion(s) thereof may be displayed in real time after the robot's modeling-related file is imported.

As an example and not a limitation, the robot (such as its mechanical arm) may also autonomously explore objects in its surrounding. Due to the mechanical arm's range of swinging (e.g., the angular range of the arm), as well as capabilities of the robot to carry respective visual tools (such as depth cameras, TOF cameras, or other stereoscopic visual tools, etc.), electronic skin, LiDAR, or to employ externally attached visual tools or radars to detect real-time shapes and positions of objects in the environment, the robot itself may be capable of performing modeling operations on the physical operating environment (including the objects within it).

As an example and not a limitation, modeling-related documents may be imported, primarily containing shape and positional information for predetermined objects. After the detection/identification of the shape and coordinates of an object by electronic skin or other visual aids, the identified shape and position may be matched with corresponding shape and positional information in the modeling-related documents. Successful matching allows for the utilization of the shape and position information from a counterpart object in the modeling-related documents. In case of unsuccessful matching, the shape and position of the object detected through sensing may be verified and adjusted (possibly including correction). Accordingly, the resulted shape and position may be used for displaying the object.

It is to be understood that the purpose of constructing a 3D model of the operating environment is to display operating environment in a 3D virtue form, gain knowledge about the mechanical arm's working environment (including that of the objects of different types therein), plan motion trajectories of the robot (or its mechanical arm(s)) to avoid objects therein, and determine safe operation regions, so as to facilitate real-time simulations and/or remote manipulations of the robot.

As an example and not a limitation, when planning the motion trajectories of the mechanical arm, an appropriate expansion factor, also known as a safety distance, may be set based on a condition of the working environment in which the robot operates (for example, whether the environment is crowded or not, or the like). For instance, as predetermined objects are generally stationary, the mechanical arm may maintain a relatively small but safe distance from these identified predetermined objects in order to bypass them (for example, avoid collision with them), thereby a safe range of motion of the robot is expanded as much as possible. For example, supposing that there are a plurality of predetermined objects in close proximity to each other, it may avoid situations in which a planned trajectory is unable to pass between adjacent predetermined objects to the extent that it is impossible to plan a trajectory for the robot to operate when the safe distance for the predetermined objects is set to be small, and this facilitates increasing the mobility of the robot while ensuring safe operation.

Figure 3:
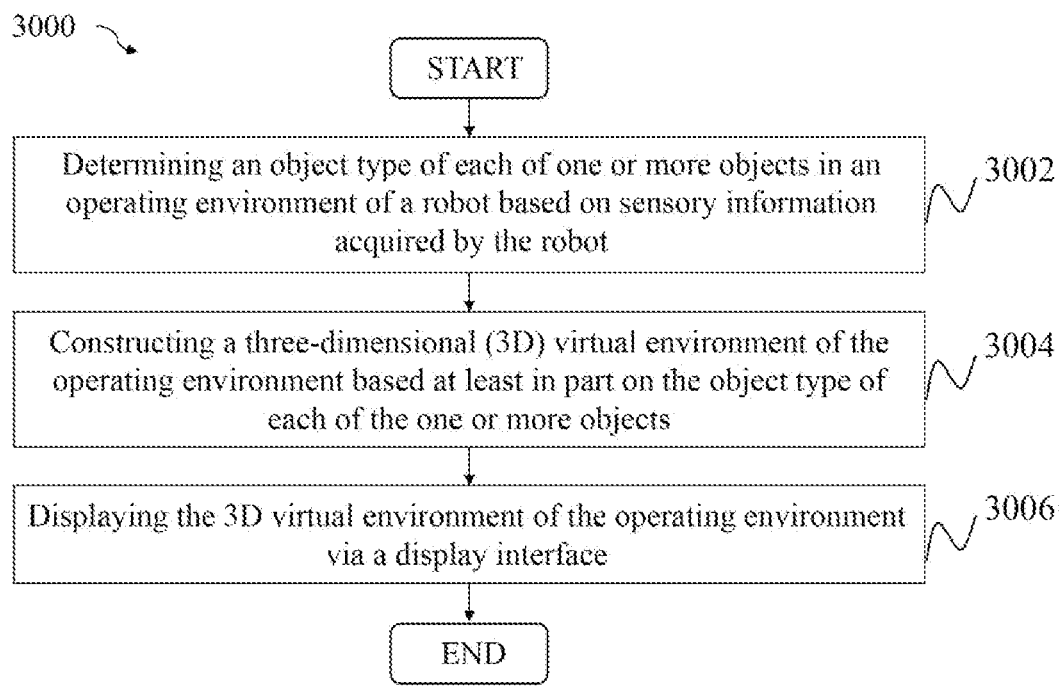
FIG. 3 illustrates a schematic flowchart of a method for displaying an operating environment of a robot according to some embodiments of the present disclosure.

FIG. 3 illustrates a schematic flowchart of a method for displaying an operating environment of a robot according to some embodiments of the present disclosure. As shown in FIG. 3, the method 3000 starts, at 3002, where an object type of each of one or more objects in an operating environment of a robot may be determined based on sensory information acquired by the robot. Then, at 3004, a three-dimensional (3D) virtual environment of the operating environment may be constructed based at least in part on the object type of each of the one or more objects. Thereafter, at 3006, the 3D virtual environment of the operating environment may be displayed via a display interface. As such, this allows for displaying three-dimensional models of the robot or a portion thereof (e.g., a mechanical arm) and predetermined objects, as well as three-dimensional models of non-predetermined objects detected in the surrounding of the robot. It facilitates path planning for the robot and effectively prevents collisions. By visualizing these models, operators or researchers may understand positions and orientations of objects of interest, enabling safe navigation of the robot. The robot may as well adapt its motion trajectories based on detected objects and the sensed characteristics thereof, ensuring efficient and collision-free operation.

FIGS. 4 through 8 depict exemplary three-dimensional virtual (e.g., simulated) scenes according to some exemplary embodiments disclosed herein. The similar reference numerals in these figures may denote identical or similar elements. For instance, reference numerals with same digits starting from the right side may represent identical or similar elements throughout the various figures.

Figure 4:
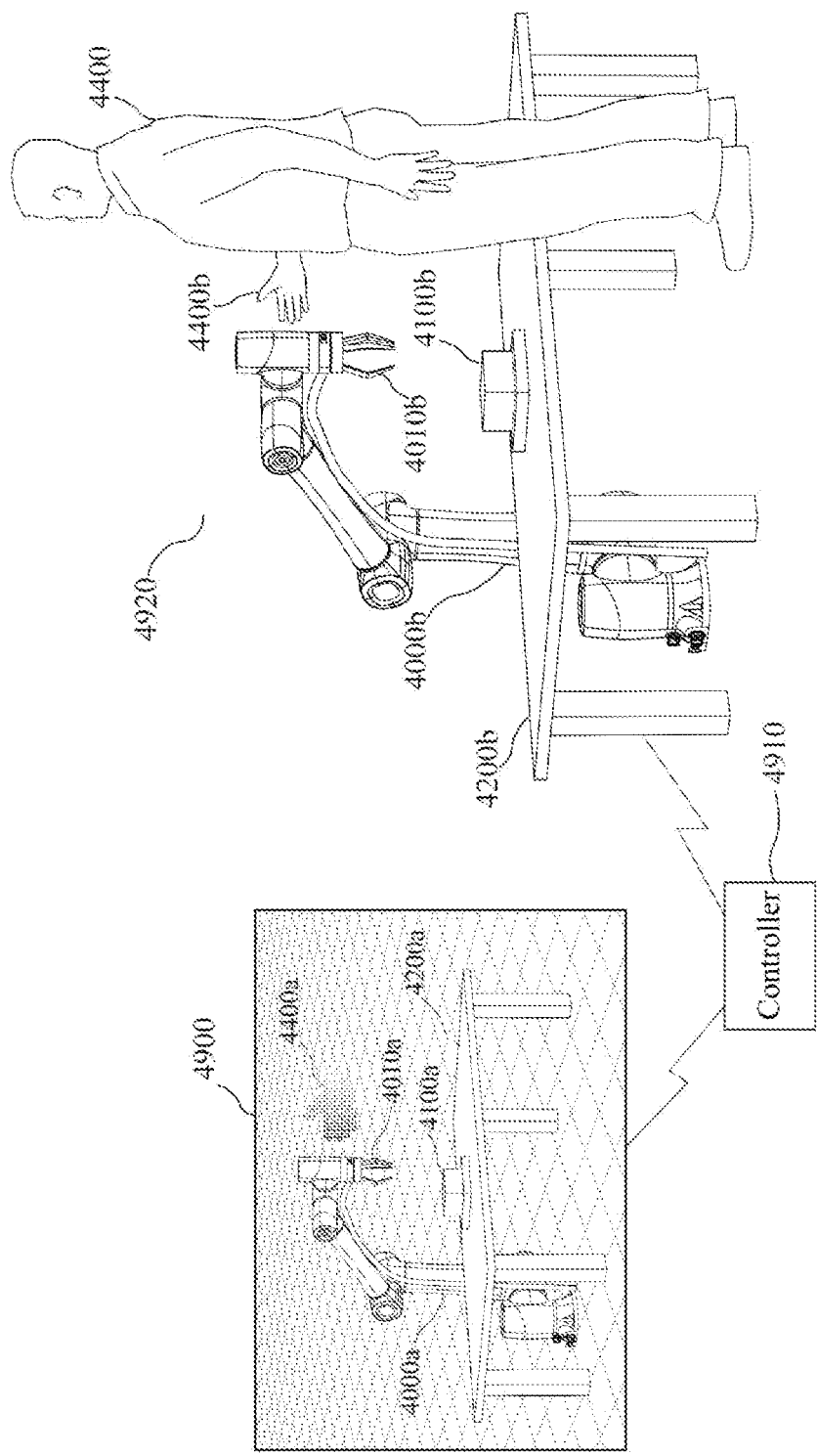
FIG. 4 illustrates a schematic diagram of a robot control system, which includes a real physical scene and a corresponding virtual 3D virtual environment in accordance with some embodiments of the present disclosure, according to some embodiments of the present disclosure.

FIG. 4 illustrates a schematic diagram of a robot control system according to some embodiments of the present disclosure.

As shown in FIG. 4, an exemplary robot control system may include a robot 4000b, a controller 4910, and a display 4900. The robot 4000b is situated in a physical environment 4920 and may include a mechanical gripper 4010b for grasping a work-piece 4100b placed on a workbench 4200b in the physical environment 4920. Correspondingly, the display 4900 may show a 3D virtual representation 4000a of the robot 4000b (including a 3D virtual representation 4010a of the mechanical gripper 4010b, etc.), a 3D virtual representation 4200a of the workbench 4200b, and a 3D virtual representation 4100a of the work-piece 4100b. As an example, the robot 4000b (or a portion thereof, such as the mechanical gripper 4010b), the workbench 4200b, and the work-piece 4100b may be predetermined objects that have been modeled and pre-stored in modeling file(s) as template objects for displaying a pre-modeled 3D environment representation on the display 4900 before the robot 4000b senses and manipulates objects in its surrounding (e.g., physical) environment. In some examples, the controller 4910 facilitates communication between the display 4900 and the robot 4000b (e.g., via wired cables or wireless communication links) to enable user-guided on-site operations of the robot 4000b. As shown, when a non-predetermined object (e.g., a hand 4400b of a human 4400) appears in the physical environment 4920, the display 4900 may correspondingly show a 3D virtual representation 4400a of a contour of the non-predetermined object 4400b sensed by sensors (e.g., electronic skins) of the robot 4000b. In an example, the 3D virtual representation 4400a may only show a portion of the non-predetermined object (e.g., corresponding to the hand 4400b of the human 4400) rather than displaying the entire non-predetermined object. Additionally, the 3D virtual representation 4400a may reflect a proximity of the non-predetermined object (or a portion thereof) to the 3D virtual representation 4000a of the robot, for example, with lower transparencies for portions of the non-predetermined object closer to the robot.

Figure 5:
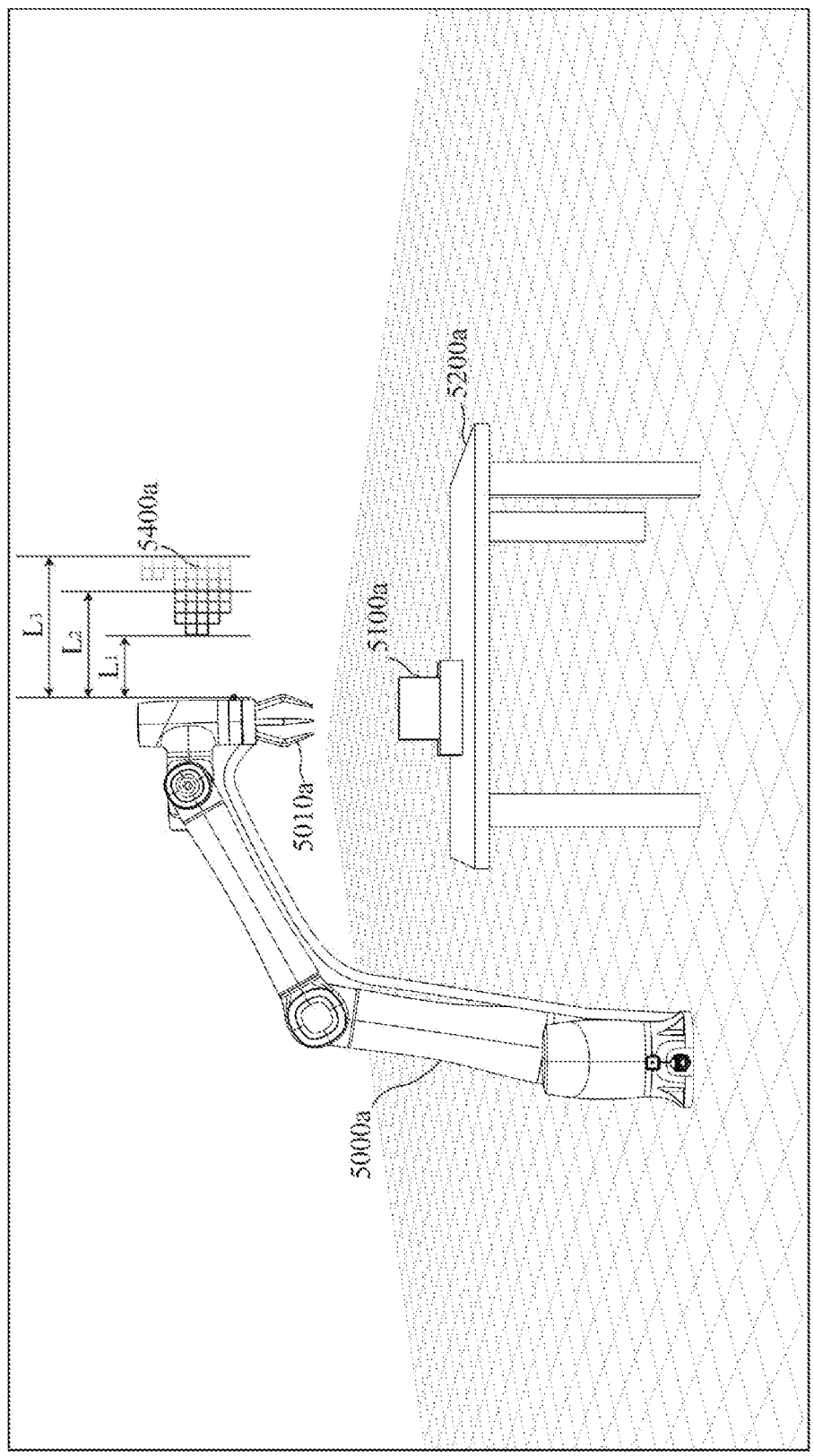
FIG. 5 illustrates a schematic diagram of a 3D virtual environment in which a representation of the proximity of a non-predetermined object to the robot is depicted, according to some embodiments of the present disclosure.

FIG. 5 illustrates a schematic diagram of a 3D virtual environment in which a representation of the proximity of a non-predetermined object to the robot is depicted, according to some embodiments of the present disclosure.

FIG. 5 schematically depicts a 3D virtual representation 5000a of the robot (including a 3D virtual representation 5010a of the mechanical gripper, etc.), a 3D virtual representation 5200a of the workbench, and a 3D virtual representation 5100a of the work-piece. As shown in FIG. 5, the proximity of the 3D virtual representation 5400a of a non-predetermined object to the 3D virtual representation 5000a of the robot (or to the 3D virtual representation 5010a of the mechanical gripper) may be represented by different levels of transparency based on the distance between them. In other words, the closer the hand is to the robot (or the mechanical gripper), the lower the transparency of that portion, in order to alert the user in front of the display to perform obstacle avoidance of the human hand to prevent potential safety incidents. The transparency may be set as needed. For example, a portion beyond a maximum predetermined distance L3 could have an opacity of 100%, indicating that it is not displayed at all. A minimum distance between the hand, specifically an end point closest to the robot, and the 3D virtual representation of the robot is defined as L1. Therefore, a distance L2 between L1 and L3 may serve as a threshold for a transparency of 50%. It should be understood that there may be other graphical representations used to indicate the distance(s) between the non-predetermined object(s) and the robot, and the present disclosure does not impose any limitations in this regard.

Figure 6:
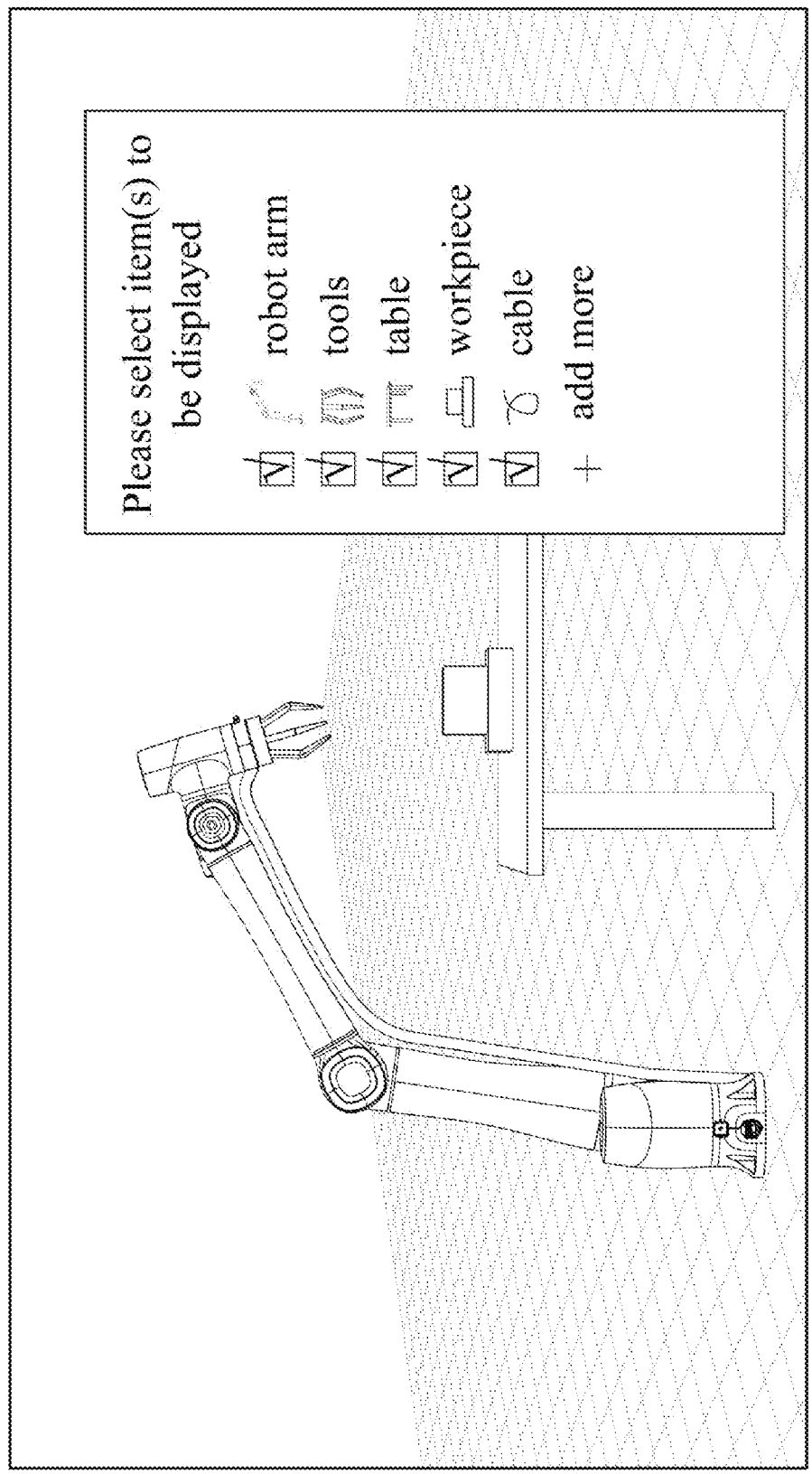
FIG. 6 illustrates a schematic diagram of a 3D virtual environment in which a window for selection of items to be displayed by the user is demonstrated, according to some embodiments of the present disclosure.

FIG. 6 illustrates a schematic diagram of a 3D virtual environment in which a window for selection of items to be displayed by the user is demonstrated, according to some embodiments of the present disclosure.

As shown, the user may select the item(s) to be displayed in the 3D virtual environment through the displayed window (e.g., selecting more than one item). Additionally, the user may add (e.g., customize) the types of items to be displayed through the interface and subsequently select them for display, and the like.

Figure 7:
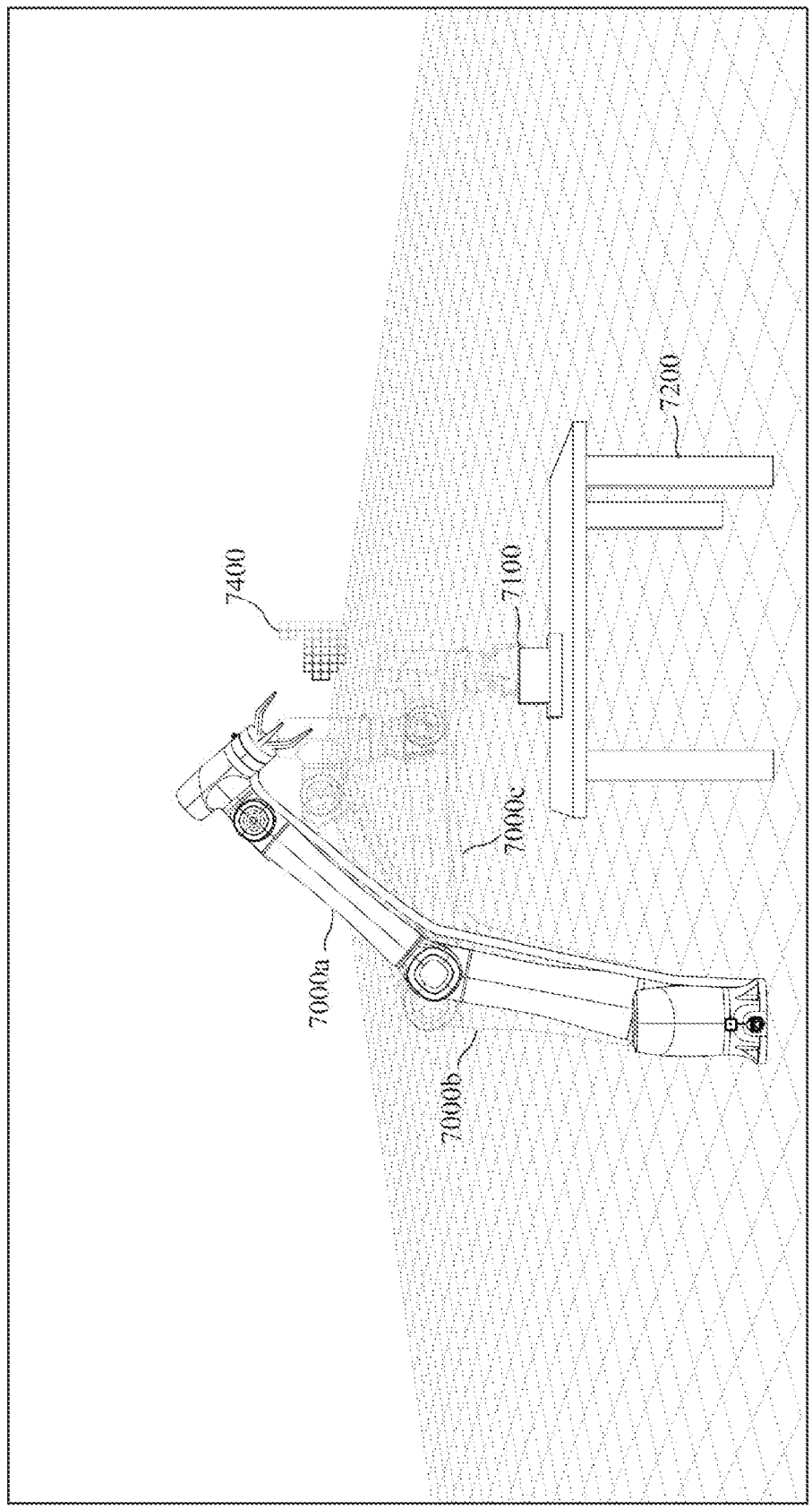
FIG. 7 illustrates a schematic diagram of a 3D virtual environment in which a process of avoidance of a non-predetermined object by the robot is shown, according to some embodiments of the present disclosure.

FIG. 7 illustrates a schematic diagram of a 3D virtual environment in which a process of avoidance of a non-predetermined object by the robot is shown, according to some embodiments of the present disclosure.

As shown, three graphics of a robot's 3D virtual representation are displayed, namely, 7000a, 7000b, and 7000c. The graphics 7000a with solid-line contour corresponds to the robot in the current moment, while the transparent graphics 7000b and 7000c represent the robot in future moments. When the robot senses an obstacle (e.g., a human hand) in the physical environment, a 3D virtual representation 7400 of the human hand is displayed in the 3D virtual environment representation. As shown in the figure, graphics 7000c represents a virtual representation of the robot in an operation trajectory planned by a robot controller or the user, without the presence of non-predetermined objects. When a non-pre-determined object appear in the vicinity of the mechanical arm within the real physical environment, for example, in the 3D virtual environment representation, a sensed contour 7400 of the non-pre-determined object is displayed at this time, and the graphics 7000b then represents a virtual representation of the robot having avoided the obstacle (i.e., the 3D contour 7400 of the human hand) in this situation. This allows the user to manipulate the robot to avoid the 3D virtual representation 7400 of the human hand according to the (e.g., real-time) modelled representation on the display, thereby ultimately successfully grasping the work-piece to be processed (e.g., shown as the 3D virtual representation 7100) located on the 3D virtual representation 7200 of the workbench.

Figure 8:
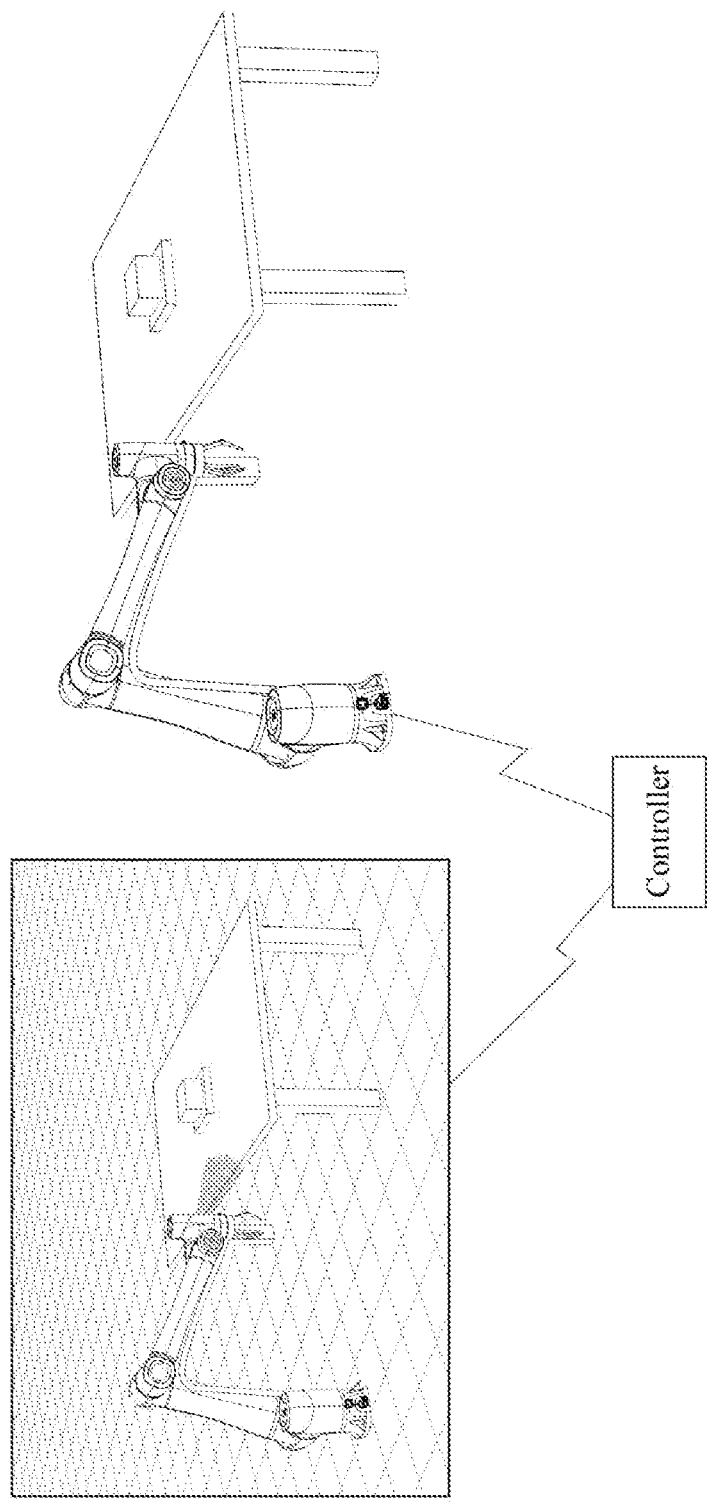
FIG. 8 illustrates a schematic diagram of a real physical scene and a corresponding virtual 3D virtual environment in accordance with some embodiments of the present disclosure.
Figure 9:
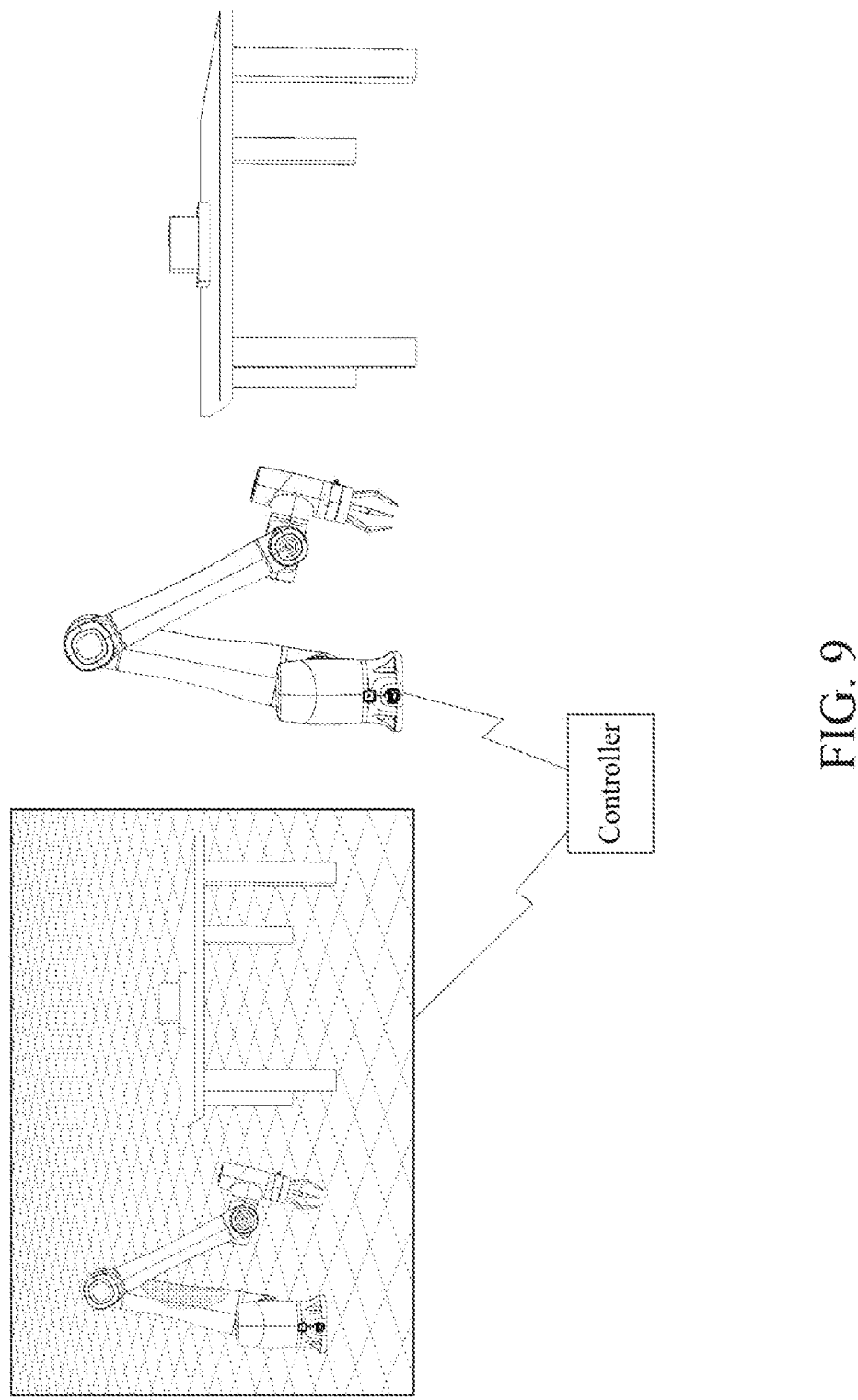
FIG. 9 illustrates another schematic diagram of a real physical scene and a corresponding virtual 3D virtual environment in accordance with some embodiments of the present disclosure.

FIG. 8 illustrates a schematic diagram of a real physical scene and a corresponding virtual 3D virtual environment in accordance with some embodiments of the present disclosure; and FIG. 9 illustrates another schematic diagram of a real physical scene and a corresponding virtual 3D virtual environment in accordance with some embodiments of the present disclosure.

As shown in FIG. 8, when the robotic arm (as a pre-stored predetermined template objects) is close to the workbench, on the display interface, for demonstration purposes, a sensed portion (e.g., a corner of the workbench) by sensors of the robot (e.g., electronic skins) may be displayed as being blurred. Similarly, as shown in FIG. 9, when the robotic arm (as a pre-stored predetermined template objects) is close to its body, on the display interface, for demonstration purposes, a sensed portion of the body may be displayed as being blurred. This is especially advantageous for prompting the user in front of the display to pay attention to avoid nearby objects (for example, fixed objects or portions of the robot itself) during manipulation of the robot to avoid damaging component(s) of the robot and/or objects in the physical environment.

The examples provided are merely for illustration purposes and aim to highlight different features of the claims. The features demonstrated in a specific example are not limited to that particular example and may be combined with other examples. It should be understood that the claims are not restricted to any specific example. Descriptions of methods and process flow diagrams are provided as illustrative examples and do not imply a specific execution order for the blocks. The order of blocks may be altered in any sequence, and terms like "thereafter", "then", or "next" are purely instructional and do not impose any restriction on the order. Articles such as "a", "an", or "the" used to refer to claim elements in the singular form should not be interpreted as limiting the element to a single instance.

The described illustrative logics, logical blocks, modules, circuits, and algorithm blocks may be implemented using electronic hardware, computer software, or a combination of both. The choice between hardware and software implementation depends on the specific application and design constraints. Those of ordinary skill in the art may employ different approaches to implement the described functionality for each particular application, without deviating from the scope of the present disclosure. The hardware utilized for implementing these components may include a general-purpose processor, DSP, ASIC, FPGA, or other programmable logic devices, discrete gate or transistor logic, discrete hardware components, or various combinations designed to perform the disclosed functions. A general-purpose processor may be a microprocessor or any conventional processor, controller, microcontroller, or state machine. The processor may also be implemented as a combination of computing devices, such as a combination of a DSP and a microprocessor, multiple microprocessors, or a mix of microprocessors and a DSP core. Alternatively, specific blocks or methods may be executed by circuitry explicitly designed for a particular function.

The previous description enables others to make or use the disclosed subject matter. Modifications to the embodiments are apparent, and the underlying principles may be applied to other embodiments without deviating from the essence or scope of the previous description. Therefore, the previous description should not be strictly limited to the embodiments shown, but rather interpreted with the broadest scope that aligns with the principles and novel features disclosed. In this context, references to an element in the singular form do not imply exclusivity unless explicitly stated, but rather encompass "one or more". Similarly, unless explicitly stated otherwise, the term "some" refers to one or more instances. All structural and functional equivalents of the elements described throughout the previous description are explicitly incorporated by reference and intended to be encompassed by the claims. Furthermore, no disclosure made herein should be construed as dedicating the disclosed subject matter to the public, regardless of whether such disclosure is explicitly mentioned in the claims. Claims should not be interpreted as means-plus-function unless the element is expressly stated using the phrase "means for". It is to be understood that the specific order or hierarchy of blocks in the disclosed processes is purely for illustration purposes. Depending on design preferences, the order or hierarchy of blocks in the processes may be rearranged while remaining within the scope of the previous description. The accompanying method claims present elements of the various blocks in a sample order, but they are not limited to that specific order or hierarchy.

If the disclosed subject matter is implemented as a product, it may be stored in a readable storage medium within a computer. This understanding allows the technical approach proposed in this disclosure to be partially or fully implemented as a software product. Alternatively, a software product may implement a part of the technical approach that benefits conventional technology. The software product may be stored in a storage medium (non-volatile and volatile), including but not limited to a USB disk, portable hard disk, ROM, RAM, floppy disk, EPROM, EEPROM, optical disk storage, magnetic disk storage or any other media capable of storing program codes in the form of instructions or data structures and that is accessible by a computer or machine. The term "disk" as used herein encompasses various types of storage media, such as compact discs (CDs), laser discs, optical discs, digital versatile discs (DVDs), floppy disks, and Blu-ray discs. Disks conventionally rely on magnetic technology for data reproduction. Conversely, the term "disc" includes these aforementioned storage media as well, but specifically denotes their optical data reproduction capability through the use of lasers.

Further aspects of the present disclosure are described in the following enumerated exemplary embodiments (EEEs).

EEE 1. A method for displaying an operating environment of a robot, including: determining an object type of each of one or more objects in the operating environment of the robot based on sensory information acquired by the robot; constructing a three-dimensional (3D) virtual environment of the operating environment based at least in part on the object type of each of the one or more objects; and displaying the 3D virtual environment of the operating environment via a display interface.

EEE 2. The method of EEE 1, where one or more electronic skins are provided on the robot, the sensory information including signals generated by the one or more electronic skins in response to the one or more objects being in a vicinity of the robot.

EEE 3. The method of EEE 1 or EEE 2, where the object type includes a predetermined object and/or a non-predetermined object.

EEE 4. The method of any one of EEE 1 to EEE 3, where based on the sensory information acquired by the robot, when positional data and/or surface shape in the sensory information matches with positional data and/or surface shape of one of a number of predetermined template objects, the matched positional data and/or surface shape in the sensory information are identified as being attributed to the predetermined object.

EEE 5. The method of any one of EEE 1 to EEE 4, where based on the sensory information acquired by the robot, when the position data and/or surface shape in the sensory information do not constitute a match with the positional data and/or surface shape of all of the predetermined template objects, the positional data and/or surface shape for which the match is not found are identified as being attributed to the non-predetermined object.

EEE 6. The method of any one of EEE 1 to EEE 5, where the constructing the 3D virtual environment of the operating environment includes: modeling the non-predetermined object based on the sensory information acquired by the robot, where a color depth, a chrominance, a transparency, or a combination thereof of a model of the non-predetermined object varies with a distance between the non-predetermined object and a closest part of the robot, and/or a distance between the non-predetermined object and a closest part of the robot is indicated.

EEE 7. The method of any one of EEE 1 to EEE 6, where the displaying the 3D virtual environment of the operating environment via the display interface includes: providing, via the display interface, an option for selecting any one of the one or more objects of which the object type is the predetermined object and/or any one of the one or more objects of which the object type is the non-predetermined object for display on the display interface.

EEE 8. The method of any one of EEE 1 to EEE 7, where the predetermined template objects include a predetermined tool, and where the method further includes: determining whether the positional data is attributed to the predetermined tool based on the positional data in the sensory information, a posture of the robot, and a predefined positional relationship between the predetermined tool and an ontology model of the robot.

EEE 9. The method of any one of EEE 1 to EEE 8, where the predetermined template objects include a portion of the robot, and where the method further includes: determining whether the sensory information is attributed to the portion of the robot based on the positional data and/or the surface shape in the sensory information, and a posture information of the robot.

EEE 10. The method of any one of EEE 1 to EEE 9, where the sensory information includes posture information of the robot, and where the method further includes: displaying at least a portion of the robot in real time via the display interface based on an imported model file of the robot and the posture information of the robot.

EEE 11. The method of any one of EEE 1 to EEE 10, where the predetermined template object includes a predetermined fixed object, and where the method further includes: displaying the predetermined fixed object in the 3D virtual environment in a stationary manner relative to a fixed reference point, where the fixed reference point includes a base of a mechanical arm of the robot.

EEE 12. The method of any one of EEE 1 to EEE 11, where the constructing the 3D virtual environment of the operating environment includes: determining and/or displaying a safe operating region of the 3D virtual environment based on the predetermined template objects in the 3D virtual environment.

EEE 13. The method of any one of EEE 1 to EEE 12, where the method further includes: planning a motion trajectory of the robot, the motion trajectory being determined to be in the safe operating region while avoiding the non-predetermined object.

EEE 14. The method of any one of EEE 1 to EEE 13, where displaying the 3D virtual environment of the operating environment via the display interface includes displaying one or more planned motion trajectories of the robot in the 3D virtual environment via the display interface.

EEE 15. The method of any one of EEE 1 to EEE 13, where the predetermined template objects are modeled by at least one of the following: a computer-aided design (CAD) document, a machine vision, a LiDAR, and/or an electronic skin.

EEE 16. A non-transitory computer-readable storage medium having stored thereon instructions that, when executed by one or more processors, cause the one or more processors to execute operations including: determining an object type of each of one or more objects in an operating environment of a robot based on sensory information acquired by the robot; constructing a three-dimensional (3D) virtual environment of the operating environment based at least in part on the object type of each of the one or more objects; and displaying the 3D virtual environment of the operating environment via a display interface.

EEE 17. The non-transitory computer-readable storage medium of EEE 16, where one or more electronic skins are provided on the robot, the sensory information including signals generated by the one or more electronic skins in response to the one or more objects being in a vicinity of the robot.

EEE 18. The non-transitory computer-readable storage medium of EEE 16 or EEE 17, where the object type includes a predetermined object and/or a non-predetermined object.

EEE 19. The non-transitory computer-readable storage medium of any one of EEE 16 to EEE 18, where the determining the object type of each of the one or more objects includes: based on the sensory information acquired by the robot, when positional data and/or surface shape in the sensory information matches with positional data and/or surface shape of one of a number of predetermined template objects, the matched positional data and/or surface shape in the sensory information are identified as being attributed to the predetermined object.

EEE 20. The non-transitory computer-readable storage medium of any one of EEE 16 to EEE 19, where the determining the object type of each of the one or more objects includes: based on the sensory information acquired by the robot, when the position data and/or surface shape in the sensory information do not constitute a match with the positional data and/or surface shape of all of the predetermined template objects, the positional data and/or surface shape for which the match is not found are identified as being attributed to the non-predetermined object.

EEE 21. The non-transitory computer-readable storage medium of any one of EEE 16 to EEE 20, where the constructing the 3D virtual environment of the operating environment includes: modeling the non-predetermined object based on the sensory information acquired by the robot, where a color depth, a chrominance, a transparency, or a combination thereof of a model of the non-predetermined object varies with a distance between the non-predetermined object and a closest part of the robot, and/or a distance between the non-predetermined object and a closest part of the robot is indicated.

EEE 22. The non-transitory computer-readable storage medium of any one of EEE 16 to EEE 21, where the displaying the 3D virtual environment of the operating environment via the display interface includes: providing, via the display interface, an option for selecting any one of the one or more objects of which the object type is the predetermined object and/or any one of the one or more objects of which the object type is the non-predetermined object for display on the display interface.

EEE 23. The non-transitory computer-readable storage medium of any one of EEE 16 to EEE 22, where the predetermined template objects include a predetermined tool, and where the instructions when executed by the one or more processors cause the one or more processors to further execute operations including: determining whether the positional data is attributed to the predetermined tool based on the positional data in the sensory information, a posture of the robot, and a predefined positional relationship between the predetermined tool and an ontology model of the robot.

EEE 24. The non-transitory computer-readable storage medium of any one of EEE 16 to EEE 23, where the predetermined template objects include a portion of the robot, and where the instructions when executed by the one or more processors cause the one or more processors to further execute operations including: determining whether the sensory information is attributed to the portion of the robot based on the positional data and/or the surface shape in the sensory information, and a posture information of the robot.

EEE 25. The non-transitory computer-readable storage medium of any one of EEE 16 to EEE 24, where the sensory information includes posture information of the robot, and where the instructions when executed by the one or more processors cause the one or more processors to further execute operations including: displaying at least a portion of the robot in real time via the display interface based on an imported model file of the robot and the posture information of the robot.

EEE 26. The non-transitory computer-readable storage medium of any one of EEE 16 to EEE 25, where the predetermined template object includes a predetermined fixed object, and where the instructions when executed by the one or more processors cause the one or more processors to further execute operations including: displaying the object in the 3D virtual environment in a stationary manner relative to a fixed reference point, where the fixed reference point includes a base of a mechanical arm of the robot.

EEE 27. The non-transitory computer-readable storage medium of any one of EEE 16 to EEE 26, where the constructing the 3D virtual environment of the operating environment includes: determining and/or displaying a safe operating region of the 3D virtual environment based on the predetermined template objects in the 3D virtual environment.

EEE 28. The non-transitory computer-readable storage medium of any one of EEE 16 to EEE 27, where the instructions when executed by the one or more processors cause the one or more processors to further execute operations including: planning a motion trajectory of the robot, the motion trajectory being determined to be in the safe operating region while avoiding the non-predetermined object.

EEE 29. The non-transitory computer-readable storage medium of any one of EEE 16 to EEE 28, where displaying the 3D virtual environment of the operating environment via the display interface includes displaying one or more planned motion trajectories of the robot in the 3D virtual environment via the display interface.

EEE 30. The non-transitory computer-readable storage medium of any one of EEE 16 to EEE 29, where the predetermined template objects are modeled by at least one of the following: a computer-aided design (CAD) document, a machine vision, a LiDAR, and/or an electronic skin.

EEE 31. A system, including one or more sensors; one or more processors; and one or more memory devices that store instructions that, when executed by the one or more processors, cause the one or more processors to execute operations including: determining an object type of each of one or more objects in an operating environment of a robot based on sensory information acquired by the robot; constructing a three-dimensional (3D) virtual environment of the operating environment based at least in part on the object type of each of the one or more objects; and displaying the 3D virtual environment of the operating environment via a display interface.

EEE 32. A robot, including a mechanical arm; one or more sensors, the one or more sensors including an electronic skin; a controller; a display; one or more memory devices that store instructions that, when executed, cause the controller to execute operations including: determining an object type of each of one or more objects in an operating environment of a robot based on sensory information acquired by the robot; constructing a three-dimensional (3D) virtual environment of the operating environment based at least in part on the object type of each of the one or more objects; and displaying the 3D virtual environment of the operating environment via a display interface.

While the present disclosure has been described in connection with practical and preferred embodiments, it is to be understood that the present disclosure is not limited to those disclosed embodiments but intends to encompass various arrangements made without departing from the broadest interpretation of the appended claims.

What is claimed is:

1. A method for displaying an operating environment of a robot, the robot is provided thereon one or more electronic skins including one or more electrode arrays for sensing positional data and surface shape of objects present in the operating environment of the robot without the need to contact the objects, the method comprising:
    obtaining capacitance values or variations in capacitance values of electrodes of the one or more electrode arrays of the one or more electronic skins;
    acquiring sensory information including signals generated by the one or more electronic skins in response to detecting that one or more objects are present within a detection range of the one or more electrode arrays based on the capacitance values of the electrodes, wherein the sensory information indicates positional data and surface shape of the one or more objects;
    determining an object type of each of the one or more objects in the operating environment of the robot based on one or both of the positional data and the surface shape indicated by the sensory information acquired by the robot via the one or more electronic skins;
    constructing a three-dimensional (3D) virtual environment of the operating environment, including a 3D model of at least a portion of the one or more objects present in the operational environment, based at least in part on the sensory information and the object type of each of the one or more objects; and
    displaying the 3D virtual environment of the operating environment via a display interface.

2. The method of claim 1, wherein determining the object type includes determining whether the object type of each of the one or more objects is one of a predetermined object or a non-predetermined object based on the sensory information acquired by the robot via the one or more electronic skins.

3. The method of claim 2, wherein determining whether the object type of each of the one or more objects is one of a predetermined object or a non-predetermined object includes:
    determining, based on the sensory information acquired by the robot, that one or both of the positional data and surface shape in the sensory information matches with one or both of positional data and surface shape of one of a number of predetermined template objects, and
    identifying the matched one or both of the positional data and the surface shape in the sensory information as being attributed to the predetermined object.

4. The method of claim 3, wherein determining whether the object type of each of the one or more objects is one of a predetermined object or a non-predetermined object includes:
    determining, based on the sensory information acquired by the robot, that one or both of the positional data and the surface shape in the sensory information do not constitute a match with the positional data and the surface shape of all of the predetermined template objects, and
    identifying the one or both of the positional data and the surface shape for which the match is not found as being attributed to the non-predetermined object.

5. The method of claim 2, wherein constructing the 3D virtual environment of the operating environment includes:
    modeling the non-predetermined object based on the sensory information acquired by the robot, wherein the modeling of the non-predetermined object includes one or both of the following:
        varying a color depth, a chrominance, a transparency, or a combination thereof of a model of the non-predetermined object with a distance between the non-predetermined object and a closest part of the robot, and
        indicating a distance between the non-predetermined object and a closest part of the robot.

6. The method of claim 2, wherein displaying the 3D virtual environment of the operating environment via the display interface includes:
    providing, via the display interface, an option for selecting one or both of the following among the one or more objects for display on the display interface:
        any one of the one or more objects of which the object type is the predetermined object, and
        any one of the one or more objects of which the object type is the non-predetermined object.

7. The method of claim 3, wherein the predetermined template objects include a predetermined tool, and wherein the method further comprises:
    determining whether the positional data is attributed to the predetermined tool based on the positional data in the sensory information, a posture of the robot, and a predefined positional relationship between the predetermined tool and an ontology model of the robot.

8. The method of claim 3, wherein the predetermined template objects include a portion of the robot, and wherein the method further comprises:
    determining whether the sensory information is attributed to the portion of the robot based on the one or both of the positional data and the surface shape in the sensory information, and posture information of the robot.

9. The method of claim 1, wherein the sensory information includes posture information of the robot, and wherein the method further comprises:
    displaying at least a portion of the robot in real time via the display interface based on an imported model file of the robot and the posture information of the robot.

10. The method of claim 3, wherein the predetermined template objects include a predetermined fixed object, and wherein the method further comprises:
    displaying the predetermined fixed object in the 3D virtual environment in a stationary manner relative to a fixed reference point, wherein the fixed reference point includes a base of the robot.

11. The method of claim 3, wherein constructing the 3D virtual environment of the operating environment includes determining a safe operating region of the 3D virtual environment based on the predetermined template objects in the 3D virtual environment, and displaying the 3D virtual environment of the operating environment includes displaying the safe operating region of the 3D virtual environment via the display interface.

12. The method of claim 11, wherein the method further comprises:
    planning a motion trajectory of the robot, the motion trajectory being determined to be in the safe operating region while avoiding the non-predetermined object.

13. The method of claim 1, wherein displaying the 3D virtual environment of the operating environment via the display interface includes displaying one or more planned motion trajectories of the robot in the 3D virtual environment via the display interface.

14. The method of claim 1, wherein determining the object type comprises:
    deriving the one or both of the positional data and the surface shape of the one or more objects in the operating environment of the robot based on one or both of the capacitance values of the electrodes of the one or more electrode arrays and coordinate information corresponding to the electrodes of the one or more electrode arrays, respectively.

15. The method of claim 1, wherein constructing the 3D virtual environment of the operating environment comprises:
    responsive to determining that the object type of a first object of the one or more objects is a predetermined object based on the sensory information, importing a first 3D model representing first positional data and first surface shape of a predetermined template object corresponding to the first object, and rendering the first 3D model of the predetermined template object in the 3D virtual environment of the operating environment of the robot.

16. The method of claim 1, wherein constructing the 3D virtual environment of the operating environment comprises:
    responsive to determining that the object type of a second object of the one or more objects is a non-predetermined object based on the sensory information, dynamically generating a second 3D model representing second positional data and second surface shape of at least a portion of the second object, and rendering the second 3D model of the second object in the 3D virtual environment of the operating environment of the robot in real-time.

17. A non-transitory computer-readable storage medium having stored thereon instructions that, when executed by one or more processors, cause the one or more processors to execute operations for displaying an operating environment of a robot, the robot is provided thereon one or more electronic skins including one or more electrode arrays for sensing positional data and surface shape of objects present in the operating environment of the robot without the need to contact the objects, the operations comprising:
    obtaining capacitance values or variations in capacitance values of electrodes of the one or more electrode arrays of the one or more electronic skins;
    acquiring sensory information including signals generated by the one or more electronic skins in response to detecting that one or more objects are present within a detection range of the one or more electrode arrays based on the capacitance values of the electrodes, wherein the sensory information indicates positional data and surface shape of the one or more objects;
    determining an object type of each of the one or more objects in the operating environment of the robot based on one or both of the positional data and the surface shape indicated by the sensory information acquired by the robot via the one or more electronic skins;
    constructing a three-dimensional (3D) virtual environment of the operating environment, including a 3D model of at least a portion of the one or more objects present therein, based at least in part on the sensory information and the object type of each of the one or more objects; and
    displaying the 3D virtual environment of the operating environment via a display interface.

18. The non-transitory computer-readable storage medium of claim 17, wherein determining the object type includes determining whether the object type of each of the one or more objects is one of a predetermined object or a non-predetermined object based on the sensory information acquired by the robot.

19. The non-transitory computer-readable storage medium of claim 18, wherein determining whether the object type of each of the one or more objects is one of a predetermined object or a non-predetermined object includes:
    determining, based on the sensory information acquired by the robot, that one or both of the positional data and surface shape in the sensory information matches with one or both of positional data and surface shape of one of a number of predetermined template objects, and
    identifying the matched one or both of the positional data and the surface shape in the sensory information as being attributed to the predetermined object.

20. The non-transitory computer-readable storage medium of claim 18, wherein determining whether the object type of each of the one or more objects is one of a predetermined object or a non-predetermined object includes:
    determining, based on the sensory information acquired by the robot, that one or both of the positional data and the surface shape in the sensory information do not constitute a match with the positional data and the surface shape of all of the predetermined template objects, and
    identifying the one or both of the positional data and the surface shape for which the match is not found as being attributed to the non-predetermined object.

21. A system, comprising:
    one or more sensors, including one or more electric skins;
    one or more processors; and
    one or more memory devices that store instructions that, when executed by the one or more processors, cause the one or more processors to execute operations for displaying an operating environment of a robot, the robot is provided thereon the one or more electronic skins, the one or more electronic skins including one or more electrode arrays for sensing positional data and surface shape of objects present in the operating environment of the robot without the need to contact the objects, the operations comprising:
        obtaining capacitance values or variations in capacitance values of electrodes of the one or more electrode arrays of the one or more electronic skins;
        acquiring sensory information including signals generated by the one or more electronic skins in response to detecting that one or more objects are present within a detection range of the one or more electrode arrays based on the capacitance values of the electrodes, wherein the sensory information indicates positional data and surface shape of the one or more objects;
        determining an object type of each of the one or more objects in the operating environment of the robot based on one or both of the positional data and the surface shape indicated by the sensory information acquired by the robot via the one or more electronic skins;
        constructing a three-dimensional (3D) virtual environment of the operating environment, including a 3D model of at least a portion of the one or more objects present therein, based at least in part on the sensory information and the object type of each of the one or more objects; and displaying the 3D virtual environment of the operating environment via a display interface.

22. A robot, comprising:
- a body of the robot;
- one or more sensors, the one or more sensors including one or more electronic skins;
- a controller;
- a display interface; and
- one or more memory devices that store instructions that, when executed, cause the controller to execute operations for displaying an operating environment of the robot, the robot is provided thereon the one or more electronic skins, the one or more electronic skins including one or more electrode arrays for sensing positional data and surface shape of objects present in the operating environment of the robot without the need to contact the objects, the operations comprising:
  - obtaining capacitance values or variations in capacitance values of electrodes of the one or more electrode arrays of the one or more electronic skins;
  - acquiring sensory information including signals generated by the one or more electronic skins in response to detecting that one or more objects are present within a detection range of the one or more electrode arrays based on the capacitance values of the electrodes, wherein the sensory information indicates positional data and surface shape of the one or more objects;
  - determining an object type of each of the one or more objects in the operating environment of the robot based on one or both of the positional data and the surface shape indicated by the sensory information acquired by the robot via the one or more electronic skins;
  - constructing a three-dimensional (3D) virtual environment of the operating environment, including a 3D model of at least a portion of the one or more objects present therein, based at least in part on the sensory information and the object type of each of the one or more objects; and
  - displaying the 3D virtual environment of the operating environment via the display interface.

* * * * *